United States Patent [19]

Nava et al.

[11] Patent Number: 6,070,752
[45] Date of Patent: Jun. 6, 2000

[54] COMBINED MERCHANDISE CONTAINER AND DISPLAY DEVICE

[75] Inventors: John Nava, Ojai; John Lyons, Long Beach; Donald Farnsworth, Oakland, all of Calif.

[73] Assignee: East End, Inc., Oakland, Calif.

[21] Appl. No.: 09/160,664

[22] Filed: Sep. 25, 1998

Related U.S. Application Data

[60] Provisional application No. 60/059,938, Sep. 26, 1997.

[51] Int. Cl.$^7$ ..................................................... A47G 19/22
[52] U.S. Cl. ...................... 220/521; 220/709; 220/23.86; 206/217; 206/307
[58] Field of Search ................................ 215/6, 228, 229, 215/230, 387, 388; 220/521, 522, 523, 526, 212, 23.86, 705, 709; 206/217, 307, 308.1, 309, 310, 313

[56] References Cited

U.S. PATENT DOCUMENTS

| | | |
|---|---|---|
| D. 226,063 | 1/1973 | Warnberg . |
| D. 384,580 | 10/1997 | Fernandes et al. . |
| 1,395,594 | 11/1921 | Pfefferle . |
| 1,755,042 | 4/1930 | Zoller . |
| 1,773,972 | 8/1930 | Eberhart . |
| 2,015,028 | 9/1935 | Gillette . |
| 2,050,487 | 8/1936 | Durrant . |
| 2,120,403 | 6/1938 | Godfrey . |
| 2,174,618 | 10/1939 | Burdick . |
| 2,271,589 | 2/1942 | Hendrickson . |
| 2,374,092 | 4/1945 | Glaser . |
| 2,649,984 | 8/1953 | Abt . |
| 2,766,796 | 10/1956 | Tupper . |
| 3,071,281 | 1/1963 | Sawai . |
| 3,245,691 | 4/1966 | Gorman . |
| 3,269,734 | 8/1966 | Ottofy ................................. 206/217 X |
| 3,421,653 | 1/1969 | Whaley ............................... 215/230 X |
| 3,433,378 | 3/1969 | Ross . |
| 3,561,668 | 2/1971 | Bergstrom . |
| 3,624,787 | 11/1971 | Newman . |
| 3,734,276 | 5/1973 | Bank . |
| 3,745,055 | 7/1973 | Gorman . |
| 3,746,158 | 7/1973 | Connick . |
| 3,768,688 | 10/1973 | Linke . |

(List continued on next page.)

FOREIGN PATENT DOCUMENTS

| | | | |
|---|---|---|---|
| 2649080 | 1/1991 | France | ................................... 220/709 |

*Primary Examiner*—Stephen K. Cronin
*Assistant Examiner*—Nathan Newhouse
*Attorney, Agent, or Firm*—Pretty, Schroeder & Poplawski, P.C.

[57] ABSTRACT

A closure is provided for use with a drink container wherein the closure includes an inner member, having an opening formed therein for receiving a straw and having a peripheral portion for mounting to the drink container, and an outer member configured to be fitted to the inner member forming a compartment therebetween. The outer member also has an opening, with the opening of the outer member aligned with the opening of the inner member while the outer member is fitted to the inner member. The aligned openings permit penetration of a straw therethrough. The inner member is shaped to prevent any beverage from within the drink container from entering the compartment even while a straw penetrates the aligned openings of the inner and outer members. In one example described herein, the inner member is shaped to prevent any beverage from entering the compartment via the provision of a raised portion of the inner member positioned and configured to extend through the opening of the outer member while the outer member is fitted to the inner member. The inner member is further shaped to prevent any beverage from entering the compartment via the provision of peripheral sidewalls within the inner member extending upwardly from the peripheral portion of the inner member toward the compartment formed between the inner and outer members. Moreover, portions of the inner member forming a bottom of the compartment are positioned well above the level of any beverage contained in the drink container.

12 Claims, 13 Drawing Sheets

U.S. PATENT DOCUMENTS

| | | |
|---|---|---|
| 4,007,936 | 2/1977 | Hornsby, Jr. . |
| 4,018,355 | 4/1977 | Ando . |
| 4,074,827 | 2/1978 | Labe, III . |
| 4,389,802 | 6/1983 | McLaren et al. . |
| 4,971,211 | 11/1990 | Lake . |
| 5,064,082 | 11/1991 | Lombardi et al. . |
| 5,099,232 | 3/1992 | Howes . |
| 5,180,079 | 1/1993 | Jeng ............... 206/217 X |
| 5,375,828 | 12/1994 | Shikami . |
| 5,397,023 | 3/1995 | Toczek et al. ............ 220/709 |
| 5,489,026 | 2/1996 | D'Aloia . |
| 5,524,788 | 6/1996 | Plester . |
| 5,531,347 | 7/1996 | Goulding . |
| 5,542,532 | 8/1996 | Mitchell ............... 206/308.1 |
| 5,592,766 | 1/1997 | Mygatt . |
| 5,641,063 | 6/1997 | Gambardella et al. . |
| 5,713,463 | 2/1998 | Lakoski et al. . |
| 5,722,558 | 3/1998 | Thompson ............... 220/521 |
| 5,746,312 | 5/1998 | Johnson . |
| 5,769,263 | 6/1998 | Willingham et al. ............ 220/522 |
| 5,806,707 | 9/1998 | Boehm et al. . |
| 5,829,583 | 11/1998 | VerWeyst et al. ............ 206/308.1 |

COMBINED MERCHANDISE CONTAINER AND DISPLAY DEVICE

BACKGROUND OF THE INVENTION

I. Priority

This application claims the benefit, in part, based upon U.S. Provisional Application No. 60/059,938, filed Sep. 26, 1997.

II. Field of the Invention

The invention generally relates to closures for merchandise containers and in particular to closures for drink cups and the like.

III. Description of the Related Art

Closures for merchandise containers such as soft drink cups are well known. In some cases, it is desirable to provide the closure with a compartment for holding a prize, game token, premium or the like. As such, after purchasing a soft drink or the like, the purchaser then opens the closure to reveal the contents therein, perhaps winning a prize.

Problems however arise with the closures that have been provided with compartments, particularly when the closures are used for drink cups or other containers containing beverages. Typically, the closure is configured with a opening, such as a pair of crisscrossed slits, for receiving a straw. When a straw is inserted through the slits, liquid can seep through the slits and into the compartment thereby damaging the contents therein, perhaps rendering the contents unusable. Indeed, seepage through the slits is virtually inevitable if the portion of the closure in which the slits is formed is disposed near the level of the beverage. In such a case, downward displacement of the closure as a result of the initial insertion of the straw through the slits typically submerges the slits within the beverage causing substantial seepage through the slits. In cases where the closure compartment is at or below the level of the cup lip, the volume of this compartment actually displaces the interior volume of the cup and thus upon attachment of the closure would cause substantial spillage in a fully filled beverage. Moreover, customers at quick service restaurants and the like usually prefer beverages to be filled to the brim. With the beverage filled to the brim, substantial seepage or spillage can occur upon insertion of the straw or attachment of the closure itself causing considerable annoyance to the customer and extra work for the restaurant staff mopping up the spilled beverages. To avoid this problem, beverage cups are often filled only to a specified level well below the brim of the cup. In restaurants where the cup is automatically filled, automatic filling devices therefore need to be properly set and monitored to ensure that the beverage does not exceed the specified level. If the cup is manually filled by the staff, the staff therefore needs to constantly remember to fill the cup only to the specified level. Furthermore, in many quick service restaurants, the customers fill their own beverage cups, thereby permitting re-fills by the customer. The customers are often not aware that filling the cup to the brim will cause subsequent spillage and, hence, the customers typically overfill the cups resulting in frequent and substantial spillage in the vicinity of the beverage dispensers.

Moreover, even if no seepage or spillage through the slits occurs, the closure itself which is typically formed of plastic may have cracks or other deformities which can also result in seepage into the compartment. Such cracks may occur during manufacturing or perhaps as a result of mishandling of the closure prior to mounting the closure to the drink container. If cracks are present within portions of the closure forming the compartment, then liquid may seep through the cracks and into the compartment damaging the contents therein. Seepage through cracks is virtually inevitable if the portion of the closure forming the bottom of the compartment has such cracks and that portion is disposed near or below the level of the liquid. Buckling of the closure as a result of the downward insertion of the straw through the slits may expand or create such cracks.

In general, a substantial risk of seepage or spillage occurs if either the criss-crossed slits of the closure or the compartment itself are positioned such that, when the closure is mounted to the drink container, the slits or the bottom of the compartment are positioned at or below the top perimeter edge of the drink container. Unfortunately, prior art compartment closures for drink containers are typically configured to position both the criss-crossed slits and the bottom of the compartment well below the top perimeter edge of the drink container.

It would be desirable to provide a merchandise container closure, particularly a closure for use with drink containers, with a compartment wherein the closure is configured to avoid the aforementioned problems and it is to that end that the invention is primarily directed.

SUMMARY OF THE INVENTION

In accordance with one aspect of the invention, a closure is provided for a drink container wherein the closure comprises an inner member, having an opening formed therein for receiving a straw and having a peripheral portion for mounting to the drink container, and an outer member configured to be fitted to the inner member forming a compartment therebetween. The outer member also has an opening, with the opening of the outer member aligned with the opening of the inner member while the outer member is fitted to the inner member. The aligned openings permit penetration of a straw therethrough. The inner member is shaped to prevent liquid from within the drink container from entering the compartment even while a straw penetrates the aligned openings of the inner and outer members.

In an exemplary embodiment, the inner member is shaped to prevent liquid from entering the compartment via the provision of a raised portion of the inner member positioned and configured to extend through the opening of the outer member while the outer member is fitted to the inner member. The opening of the inner member is a pair of criss-crossed slits formed within the raised portion. The opening of the outer member is circular and the raised portion of the inner member is of a truncated conical shape. Portions of the outer member surrounding the circular opening are sized to frictionally fit against outer side surfaces of the raised portion while the outer member is fitted to the inner member. Alternatively, portions of the outer member surrounding the circular opening are sized to abut tabs formed around outer side surfaces of the raised portion while the outer member is fitted to the inner member. By providing a raised portion within which the criss-crossed slits are formed, the slits are thereby disposed, in use, well above the level of any liquid within the drink container such that, even with a straw inserted through the slits, it is highly unlikely during normal use of the cup that any liquid from within the cup will pass though the slits and into the compartment. Hence, contents within the compartment are substantially protected from contamination by the liquid even if the cup is initially filled to the brim and even if significant downward displacement of the closure occurs upon insertion of the straw.

Also in the exemplary embodiment, the inner member is further shaped to prevent liquid from entering the compartment via the provision of peripheral sidewalls extending upwardly from the peripheral portion of the inner member toward the compartment formed between the inner and outer members. By providing the inner member with peripheral sidewalls, the slits through which the straw is inserted are thereby positioned still higher above the level of the liquid. Moreover, with the peripheral sidewall configuration, the compartment itself is also disposed above the level of liquid within the drink container. Thus, even if cracks are present in the inner member, perhaps as a result of a manufacturing defect or perhaps as a result of mishandling prior to mounting to the cup, the lowermost part of the compartment is still positioned above the level of the liquid such that it would be unlikely that any liquid would seep through the cracks and into the compartment. Hence, contents within the compartment are further protected from the liquid. Additionally, the location of the compartment above the level of the cup lip avoids displacement of any interior volume of the cup and thereby precludes spillage.

In some embodiments, the compartment is shaped to closely receive a disk containing digital media, such as a compact disk (CD) or a CD-ROM, with the openings of the inner and outer members aligned with a center of the compartment to permit a straw penetrating the openings to pass through a center hole within the disk. In other embodiments, the compartment is offset from the openings of the inner and outer members to permit a straw penetrating the openings to pass along side the compartment. The compartment has a rectangular shape and may hold, for example, a booklet.

In accordance with another aspect of the invention, a closure is provided for a merchandise container wherein the closure comprises a closure member for mounting to an opening of the container and means for securing a digital media disk to the closure member.

In an exemplary embodiment, the means for securing a digital media disk to the closure member comprises a raised portion formed near the center of the closure member. The raised portion is surrounded by a substantially flat circular upper surface sized to permit placement of a digital media disk thereon. Tabs are formed on outer side surfaces of the raised portion and are positioned to abut inner top edges of a central opening of the digital media disk while the digital media disk is disposed against the flat circular upper surface of the closure member. This latter embodiment provides a closure with only a single member and hence may be less expensive to manufacture.

Other features and advantages of the invention are provided as well. Apparatus embodiments of the invention are also provided.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
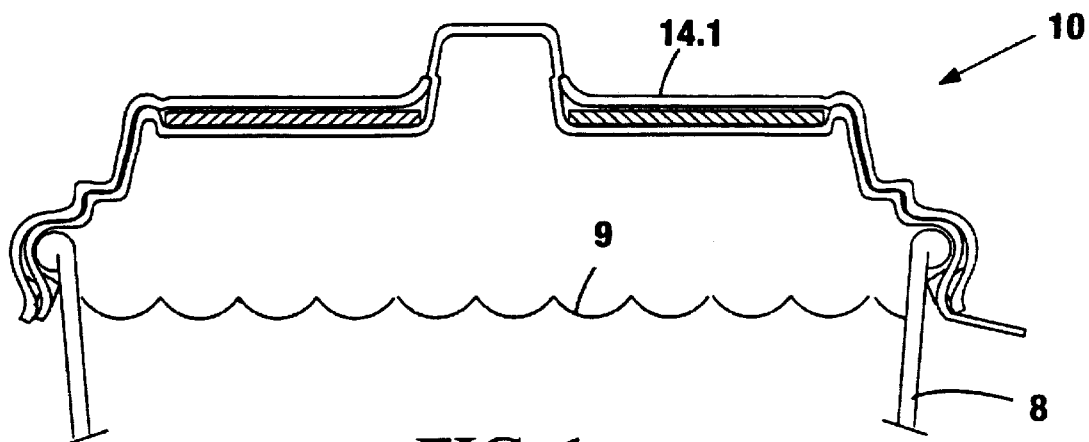
FIG. 1 is an cross-sectional view of a merchandise container closure of a first exemplary embodiment of the invention, taken on a plane which contains the axis of symmetry of the closure.
Figure 2:
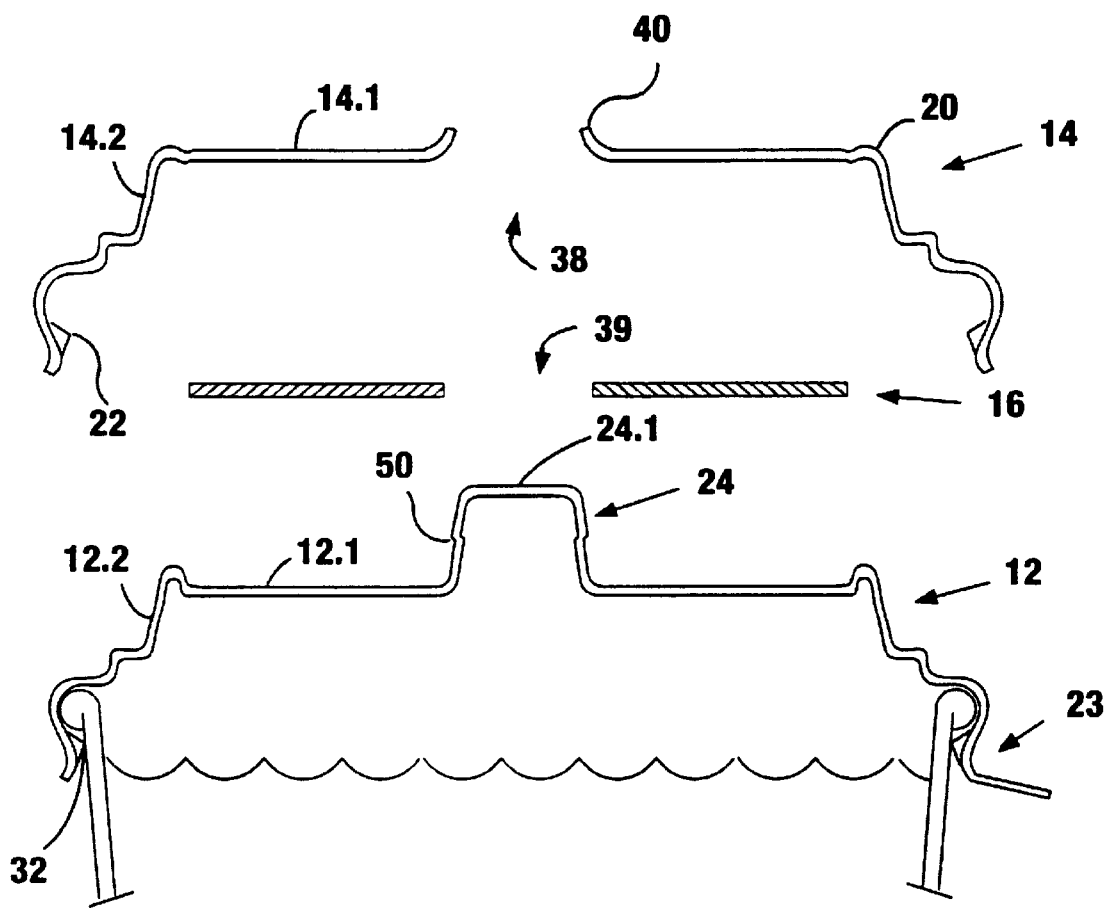
FIG. 2 is an exploded cross-sectional view of the merchandise container closure of FIG. 1, also taken on a plane which contains the axis of symmetry of the closure.

Referring now to FIGS. 1 and 2, a closure 10 of a first exemplary embodiment of the invention is illustrated. Closure 10 is comprised of an inner member 12 and an outer member 14 and, in use, is mounted to a drink cup or other merchandise container 8. In the example of FIG. 2, cup 8 includes a liquid beverage 9. The inner and outer members form a compartment therebetween for receiving a digital media disk 16, such as a CD, CD-ROM, or other contents. Outer member 14 has a central discate portion 14.1 surrounded by a tall, cylindrical sidewall 14.2. Inner member 12 likewise has a central discate portion 12.1 surrounded by a matching tall, cylindrical sidewall 12.2. With the provision of tall sidewalls 12.2 and 14.2, the inner and outer members together generally take the form of an inverted cup configured to position its contents (i.e. media disk 16) sufficiently above the level of beverage 9 to preclude immersion of the contents in the beverage. As noted above, customers usually prefer that a beverage cup be filled to the brim. With the closure of FIGS. 1 and 2, the cup can be filled to the brim without significant risk of seepage or spillage of the beverage upon insertion of a straw (not shown). In this regard, even if the closure is displaced downwardly by a significant amount during insertion of the straw, the bottom of the closure remains above the top level of the beverage thereby preventing seepage or spillage.

As seen in FIG. 1, discate part 14.1 of outer member 14 is depressed slightly with respect to a top edge of sidewall 14.2 forming a perimeter wall 20 which serves to stiffen outer member 14. A trunco-conical flange 12.3 extends outwardly from the lower edge of cylindrical sidewall 12.2 remote from discate part 12.1. Likewise, a trunco-conical flange 14.3 extends outwardly from the lower edge of cylindrical sidewall 14.2 remote from discate part 14.1. A plurality of protrusions 22 project inwardly from the inner face of truncoconical flange 14.3. A large number of protrusions 22 may be provided. A suitable depression 23 is provided in the outer face of the trunco-conical flange 12.3 of inner member 12 for receiving protrusions 22, and thus locking inner member 12 and outer member 14 together in a nesting relationship when inner member 12 is registered with and then pushed onto outer member 14. Inner member 12 and outer member 14 are of such configuration that when locked together in the manner just described, a compartment or cavity is defined between them which is large enough to contain digital media disk 16. A raised portion 24 is formed in the center of inner member 12 which, in use, fits closely within a central opening 38 of outer member 14 and with a central opening 39 of compact disk 16. It follows, then, that raised portion 24 serves to maintain compact disk 16 substantially coaxial with the common axis of symmetry of closure members 12 and 14 when locked together and compact disk 16 is captive between inner member 12 and outer member 14.

Truncoconical flange 14.3 is sufficiently resilient and flexible, and the extent of projection of protrusions 22 into depression 23 is so limited, that outer member 14 can be separated from inner member 12 by pulling outwardly and upwardly on a single point of trunco-conical flange 14.3. A manually graspable pull tab 30 is provided at a point on the outer periphery of trunco-conical flange 14.3 in order to render it easy for the purchaser to apply such a pulling force to outer member 14, and thus to separate it from inner member 12, whereby to gain access to compact disk 16. Although not shown, another pull tab, similar to pull tab 30, may be provided on the periphery of trunco-conical flange 12.3, whereby closure 10 as a whole may readily be removed from the cup or other associated merchandise container when it is desired to remove closure 10 without gaining immediate access to digital disk 16.

Crossed slits 33 are formed on a flat top of raised portion 24 to accommodate a straw (not shown). Thus the slits for receiving a straw are formed on the top of a raised portion 24 which extends upwardly from the central discate portion of inner member 12. The discate portion is itself positioned well above the upper edges of cup 8 upon which closure 10 is mounted by virtue of tall sidewalls 12.2. With this configuration, the slits are positioned substantially above the level of liquid 9 contained in the cup. Thus, it is highly unlikely during normal use of the cup that any liquid from within the cup will pass though crossed slits 33 and into the compartment containing the digital media disk. Indeed, unless the cup is shaken vigorously or perhaps tipped sideways or upside down, no liquid whatsoever from the cup will likely pass through the crossed slits. Hence, the contents are well protected. Depending upon the embodiment, the raised portion extends preferably at least one quarter of an inch above the surrounding discate portion, and in many cases between one half inch and three quarters of an inch or even higher.

Moreover, as noted above, the high sidewalls of inner member 12 position discate portion 12.1 well above the surface of the liquid. Discate portion 12.1 forms the bottom of the compartment containing the digital media disk. Thus, even if cracks are present in discate portion 12.1, perhaps as a result of a manufacturing defect or perhaps as a result of mishandling prior to mounting to the cup, the lowermost part of the compartment is positioned well above the level of the liquid such that it would be unlikely that any liquid would seep through cracks and into the compartment and, hence, the contents of the compartment are still substantially protected from the liquid. Depending upon the embodiment, the sidewall is of sufficient height to position the flat discate portion of the inner member preferably at least one quarter of an inch above the top perimeter edge of the cup, and preferably between one half inch and one and one half inches above the top perimeter edge.

As noted, raised portion 24 extends through an opening 38 of outer member 14. Inner edges 40 of opening 38 are sized to frictionally bear against outer conical side surfaces of the raised portion to secure the inner edge of the outer member to the raised portion thereby helping secure outer member 14 to inner member 12. Moreover, the frictional fit of inner edges 40 to raised portion 24 helps further seal the compartment from seepage of liquid. Hence, even if liquid from the cup passes through crossed slits 33, perhaps because the cup is tipped over, it is still highly unlikely that any liquid would enter the compartment and the contents are thereby further protected. Also, as shown, raised portion 24 may also have a rib 50 formed around its conical sides such that inner edges 40 of the of opening 38 can abut against the rib to further secure the center portions of the outer member to the raised portion of the inner member. For embodiments wherein the rib is present, the outer member need not necessarily be sized to frictionally fit against the side surfaces of the raised member as the engagement of the rib to the inner edges of the outer member may be sufficient to secure the outer member to the raised portion.

Figure 4:
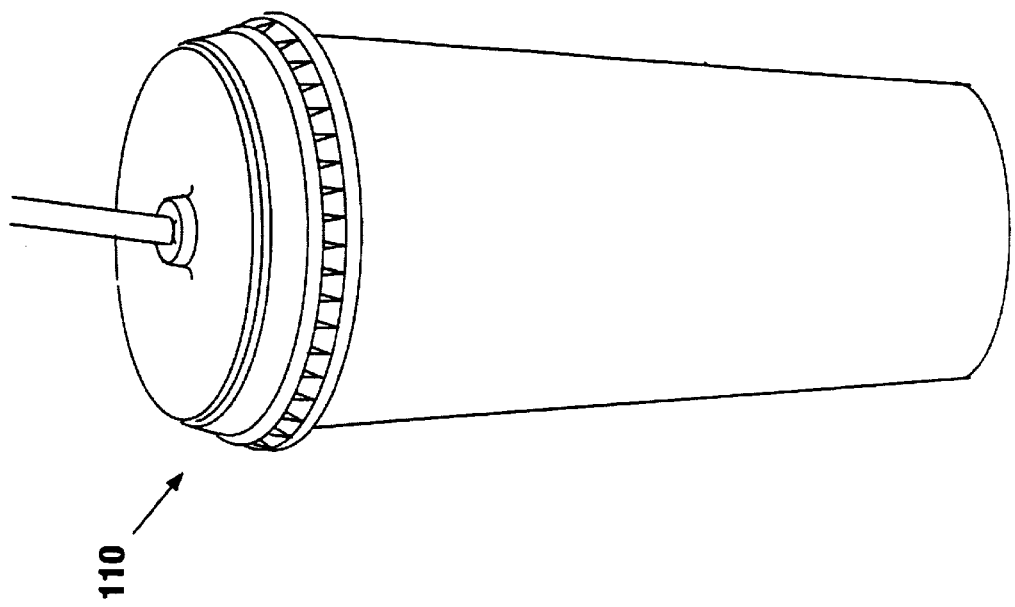
FIG. 4 is perspective view of the merchandise container closure of FIG. 3 shown mounted to a drink cup.
Figure 3:
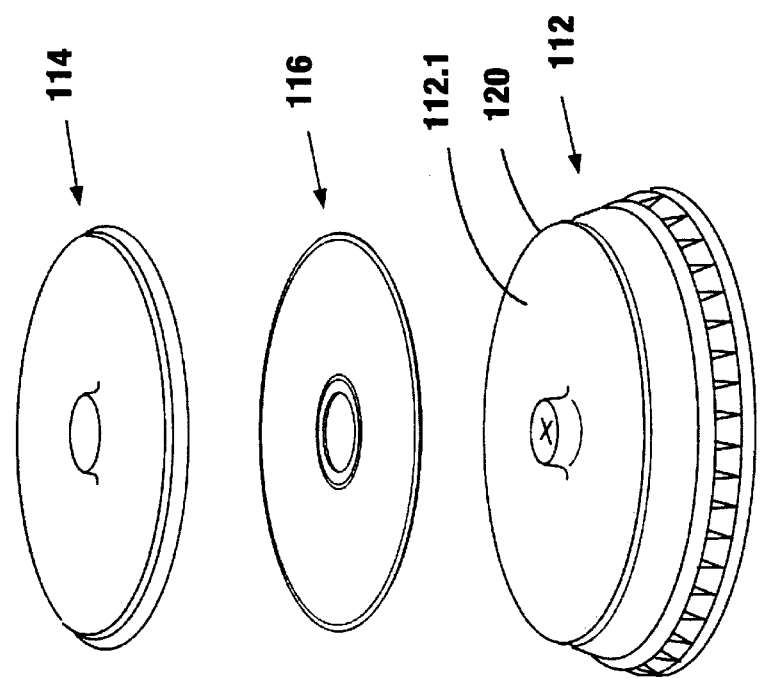
FIG. 3 is perspective view of a merchandise container closure of a second exemplary embodiment of the invention.

Referring now to FIGS. 3 and 4 a second exemplary embodiment of the invention will now be briefly described. The embodiment of FIGS. 3 and 4 is similar to that of FIGS. 1 and 2 and only pertinent differences will be described in detail. Like components are represented with like reference numerals incremented accordingly.

FIGS. 3 and 4 illustrate a closure 110 similar to that of closure 10 of FIGS. 1 and 2 but wherein an outer member 114 extends only to an outer perimeter of a central discate portion 112.1 of an inner member 112. The outer perimeter of outer member 114 is configured to snap onto a top edge of a perimeter wall 120. Suitable snap fit configurations are provided on the outer perimeter of outer member 114 and on perimeter wall 120.

Hence, unlike the embodiment of FIGS. 1 and 2, the outer member does not include sidewalls extending along the sidewalls of the inner member. Nevertheless, contents, such as a digital media disk 116, held between the inner and outer members are well secured and are substantially protected from contamination by any liquid contained within the cup. In this regard, the embodiment of FIGS. 3 and 4 shares many of the same advantages of that of FIGS. 1 and 2 including:

the provision of a tall sidewall as part of the inner member; the provision of a raised central portion upon which crossed slits are formed; the provision of a frictionally seal between inner edges of the outer member and side surfaces of the raised portion; and the positioning of a bottom surface of the compartment containing the disk well above the level of any liquid within the cup.

Figure 5:
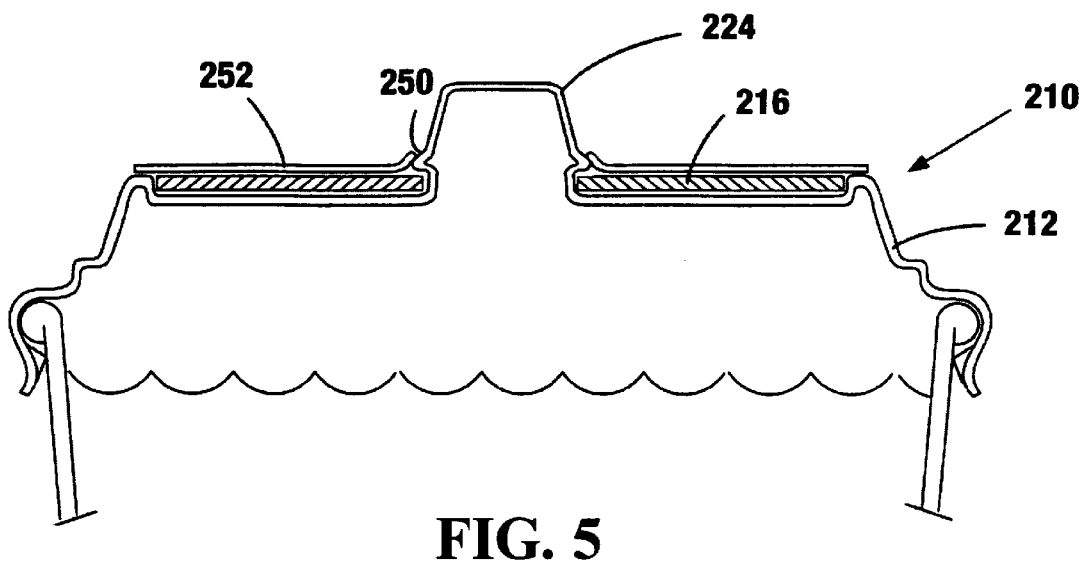
FIG. 5 is an cross-sectional view of a merchandise container closure of a third exemplary embodiment of the invention, taken on a plane which contains the axis of symmetry of the closure.
Figure 6:
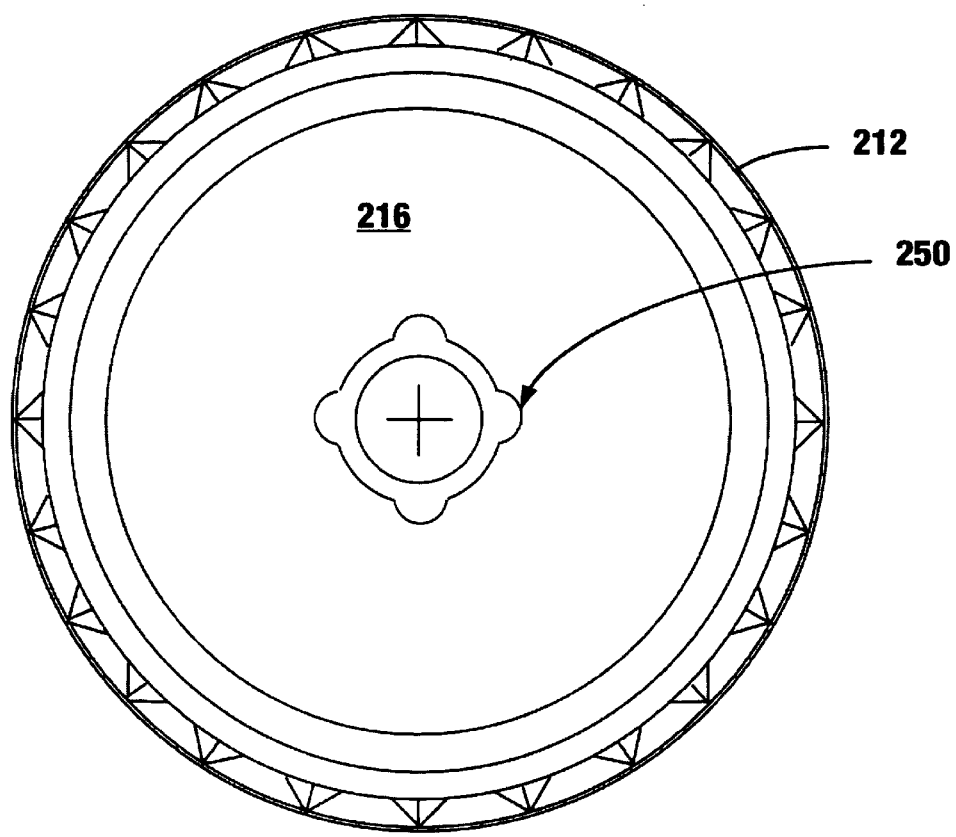
FIG. 6 is an exploded cross-sectional view of the merchandise container closure of FIG. 5, taken on a plane which contains the axis of symmetry of the closure.
Figure 7:
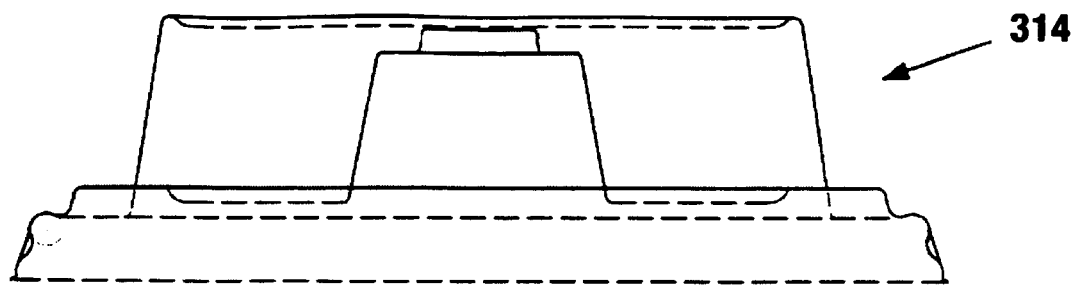
FIG. 7 is an front elevational view of a top part of a merchandise container closure of a fourth exemplary embodiment of the invention.
Figure 8:
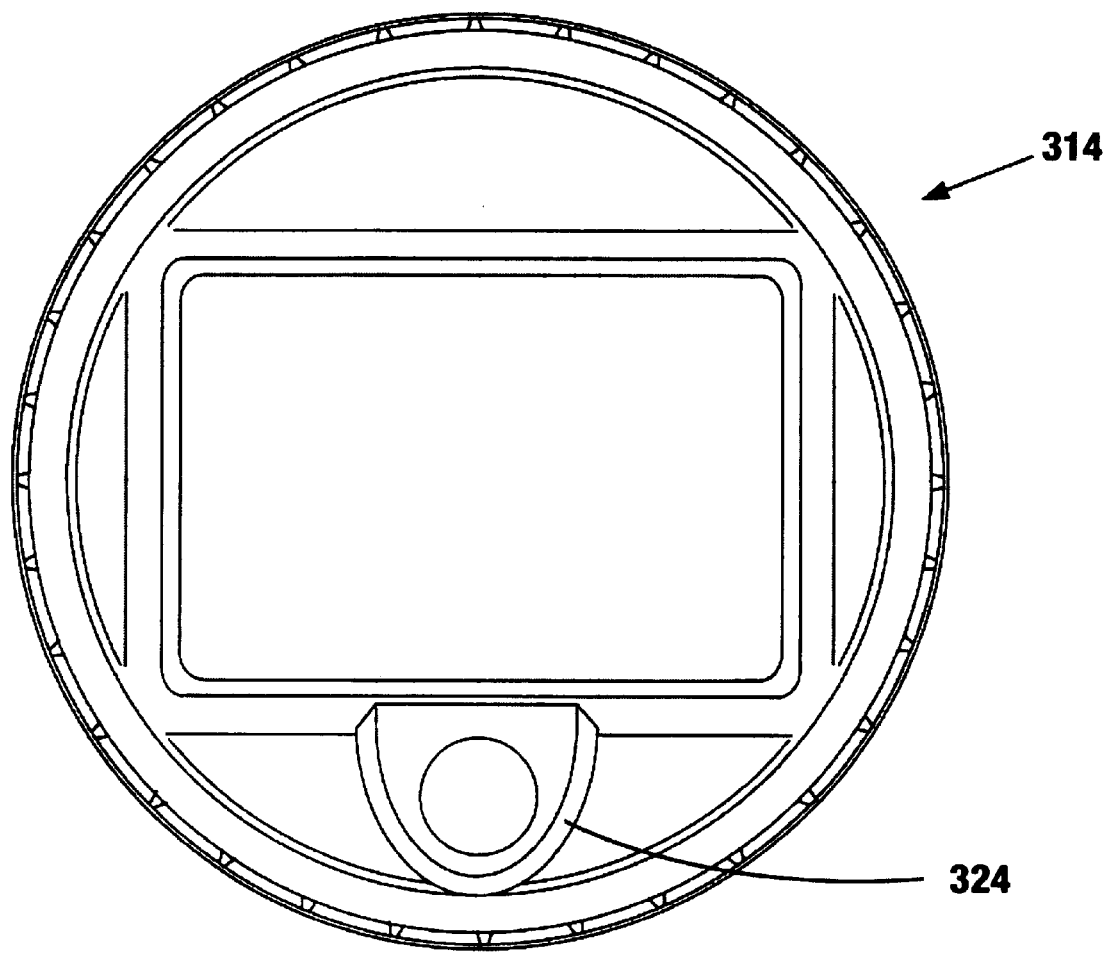
FIG. 8 is a top planar view of the top part of FIG. 7.
Figure 9:
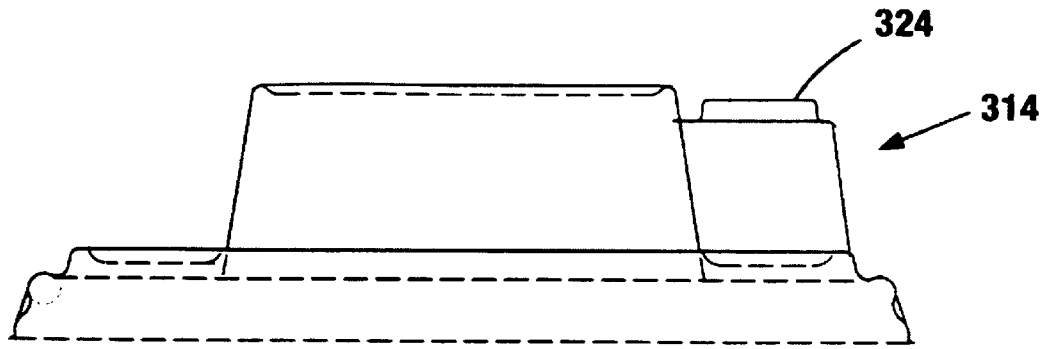
FIG. 9 is a side elevational view of the top part of FIG. 7.
Figure 10:
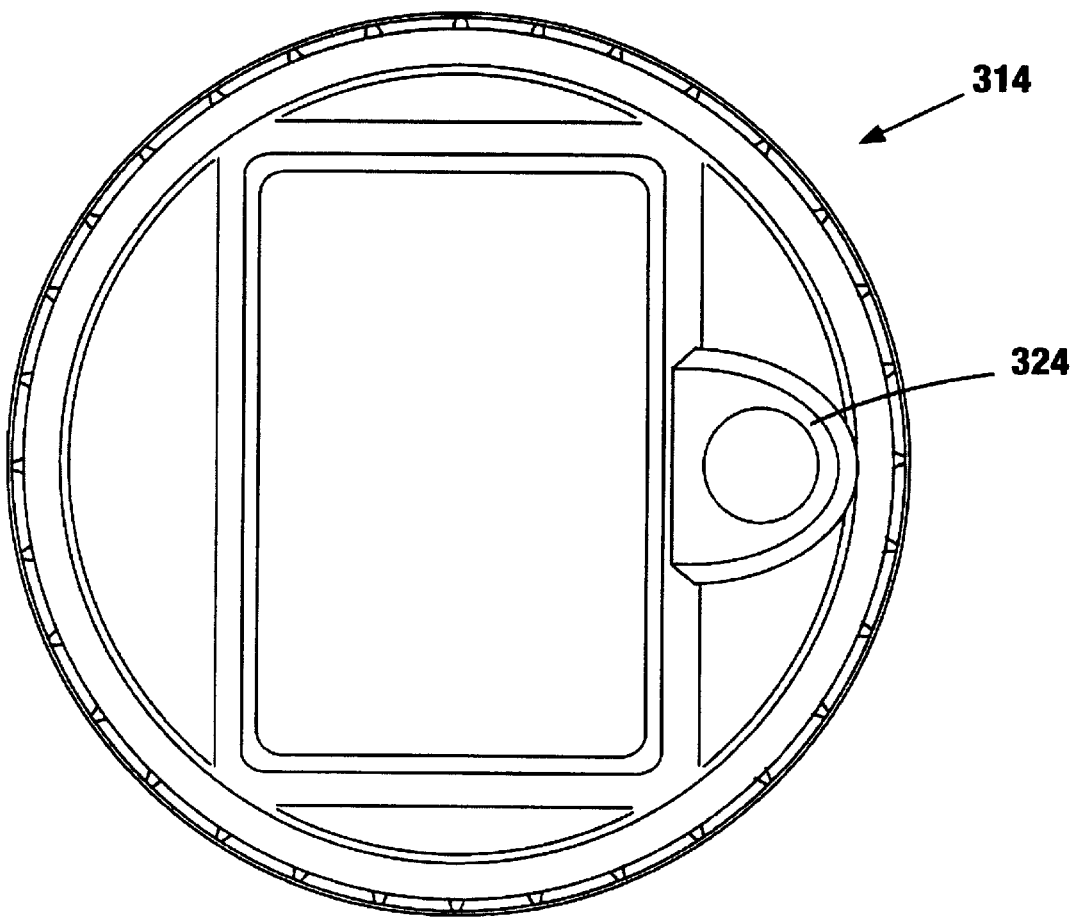
FIG. 10 is another top planar view of the top part of FIG. 7, rotated by 90 degrees.
Figure 11:
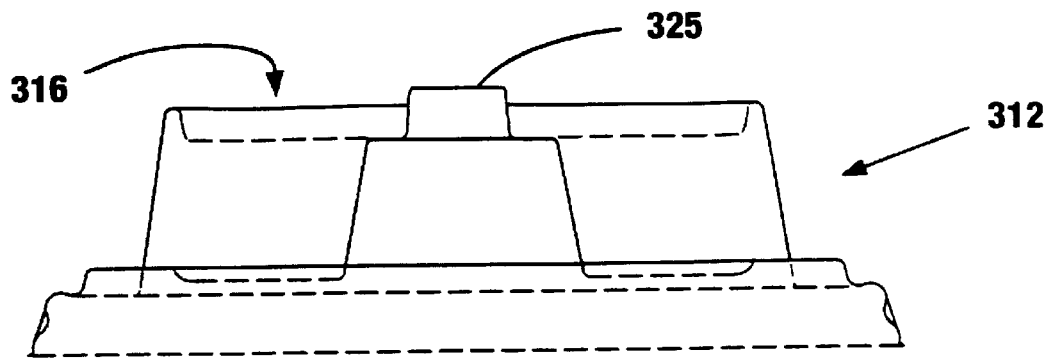
FIG. 11 is a front elevational view of a bottom part of a merchandise container closure of the fourth exemplary embodiment of the invention.
Figure 12:
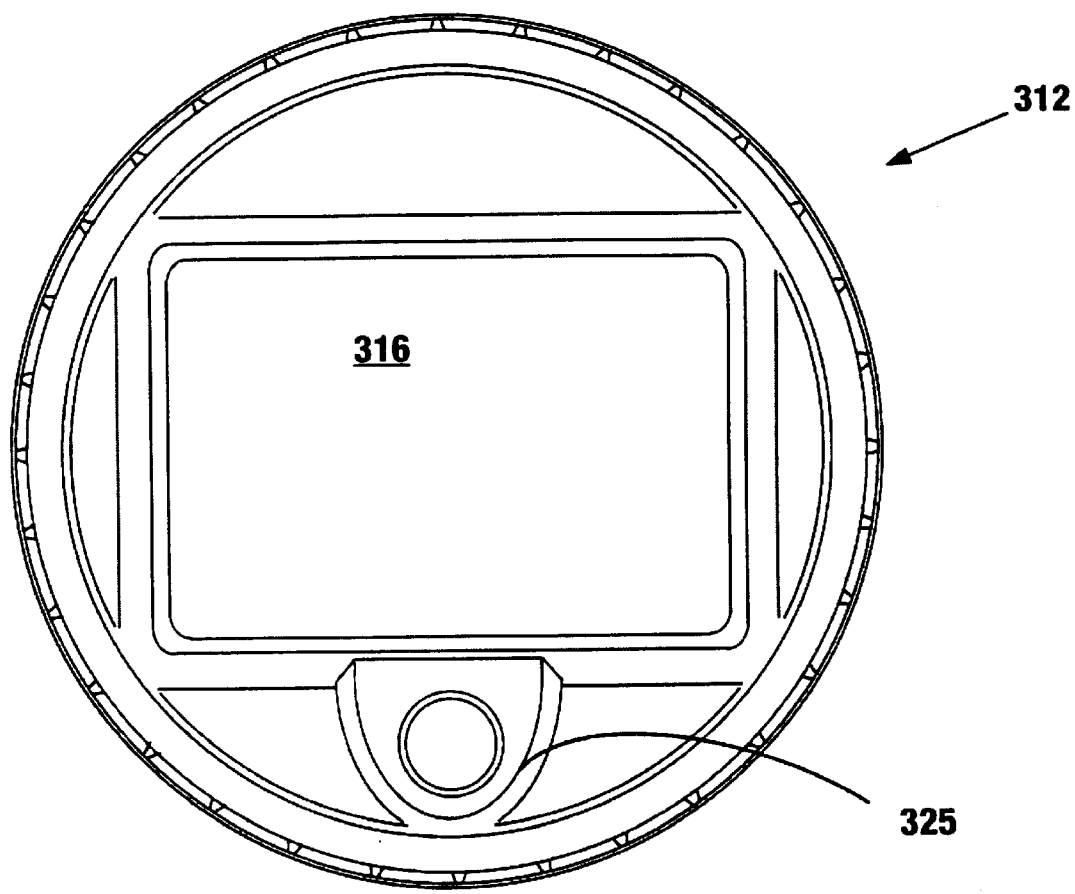
FIG. 12 is a top planar view of the bottom part of FIG. 11.
Figure 13:
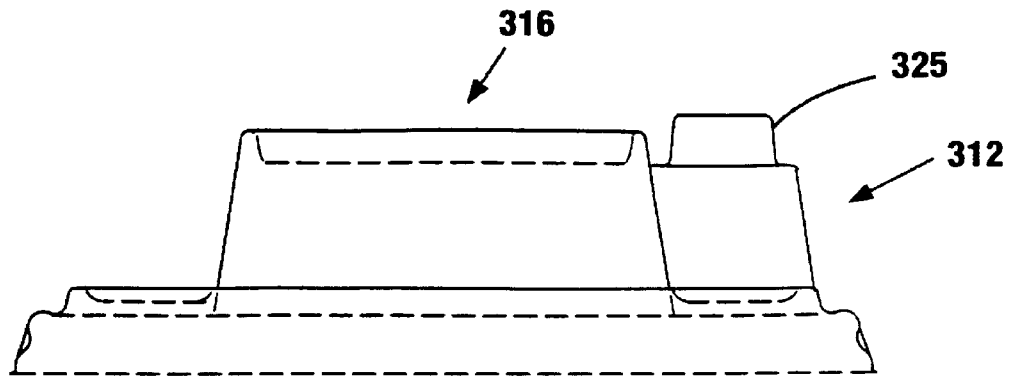
FIG. 13 is a side elevational view of the bottom part of FIG. 11.
Figure 14:
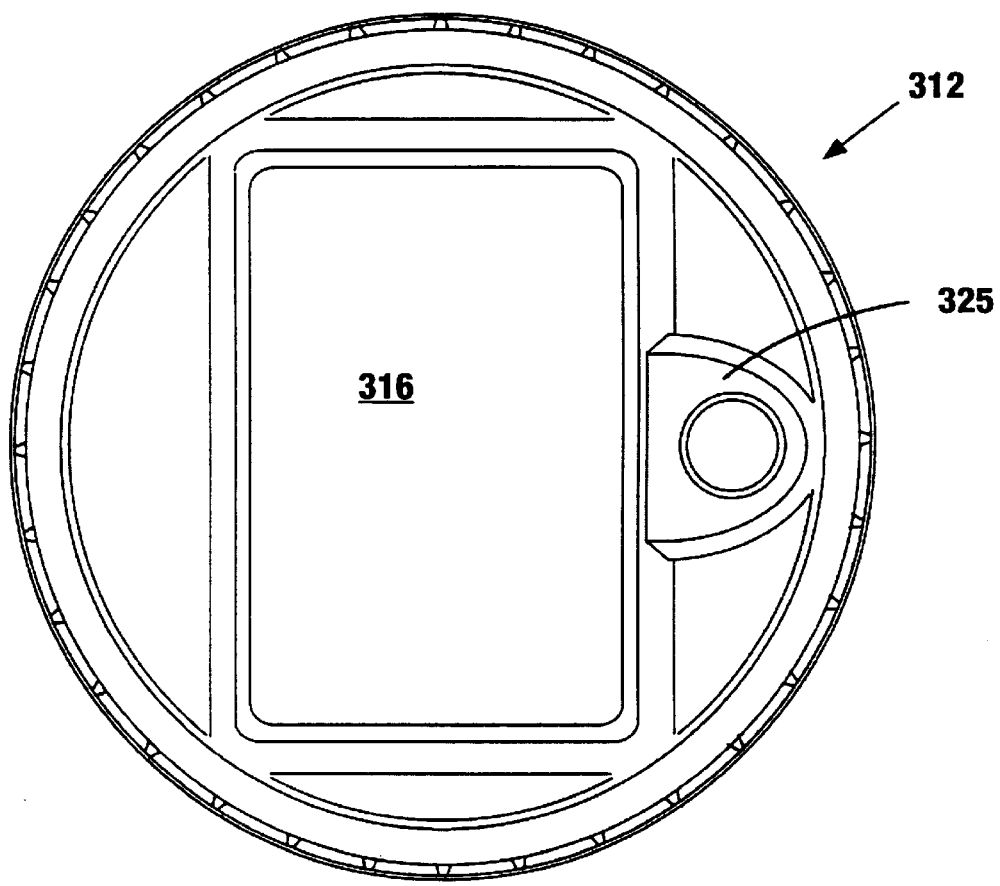
FIG. 14 is another top planar view of the bottom part of FIG. 11, rotated by 90 degrees.

Referring now to FIGS. 5 and 6 a third exemplary embodiment of the invention will now be briefly described. The embodiment of FIGS. 5 and 6 is similar to that of the foregoing embodiments and only pertinent differences will be described in detail. As before, like components are represented with like reference numerals incremented accordingly.

FIGS. 5 and 6 illustrate a closure 210 similar to that of closure 10 of FIGS. 1 and 2 but having only a single member 212 corresponding to that of inner member 12 of FIGS. 1 and 2. Raised portion 224 includes holding tabs 250 configured to abut against inner edges of a central opening of a digital media disk 216 thereby securing the disk against a top surface of a discate central portion 212.1 of the single closure member. As shown most clearly in FIG. 6, a plurality of tabs are employed spaced radially around the perimeter of raised portion 224. Four such tabs are shown in FIG. 6. In other embodiments, more or fewer tabs may be used. In particular, three tabs may be appropriate in some instances. In other cases, a single rib extending entirely around the perimeter of the raised portion is preferred to a plurality of individual tabs.

By providing tabs or ribs on the central raised portion of the closure, the digital media disk is thereby secured without the need of a outer member. Nevertheless, the disk is still substantially protected from the liquid contents of the cup by virtue of tall sidewalls positioning the disk at a substantial height above the level of the liquid and by virtue of raised portion 224 upon which the criss-crossed slots are formed. To further protect the digital media disk, a sealing member 252 may be provided as shown in FIG. 5. The sealing member may be a thin foil sheet.

Referring now to FIGS. 7–14, a fourth exemplary embodiment of the invention will now be briefly described. The embodiment of FIGS. 7–14 is similar to that of the foregoing embodiments and only pertinent differences will be described in detail. As before, like components are represented with like reference numerals incremented accordingly. For clarity is illustrating the fourth embodiment, four views of a top or upper part of the embodiment are provided (FIGS. 7–10) and four views of the bottom or inner part of the embodiment are separately provided.

FIGS. 7–14 illustrate a closure 310 wherein an inner member 312 and an outer member 314 are configured to provide a rectangular compartment 316 for holding a booklet or the like, rather than a disk-shaped compartment for holding a digital media disk. Raised portions 324 and 325 of the outer and inner members, respectively, are offset from the center of the closure such that a straw inserted through the closure into a cup passes along side compartment 316 rather than through the compartment such that contents within the compartment need not have a central hole or opening. The embodiment of FIGS. 7–14 nevertheless shares many of the same advantages of that of FIGS. 1 and 2 including: the provision of a tall sidewall as part of the inner and outer members; the provision of a raised portion of the inner member upon which crossed slits are formed; and the positioning of a bottom surface of the compartment well above the level of any liquid within the cup.

Referring now to FIGS. 15–18, a fifth exemplary embodiment of the invention will now be briefly described. The embodiment of FIGS. 15–18 is similar to that of the foregoing embodiments and only pertinent differences will be described in detail. As before, like components are represented with like reference numerals incremented accordingly.

Figure 15:
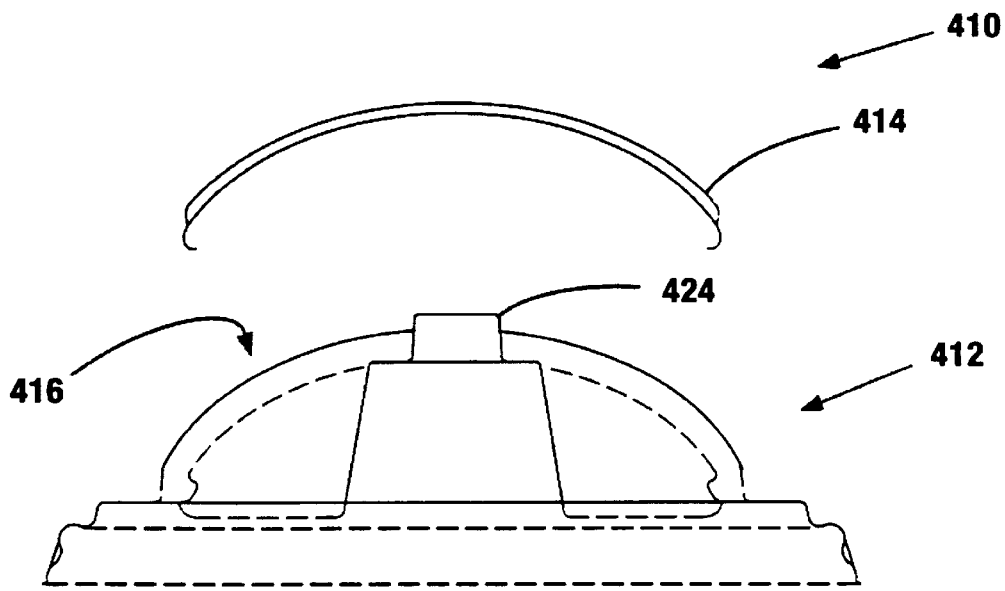
FIG. 15 is an front exploded view of a merchandise container closure of a fifth exemplary embodiment of the invention.
Figure 16:
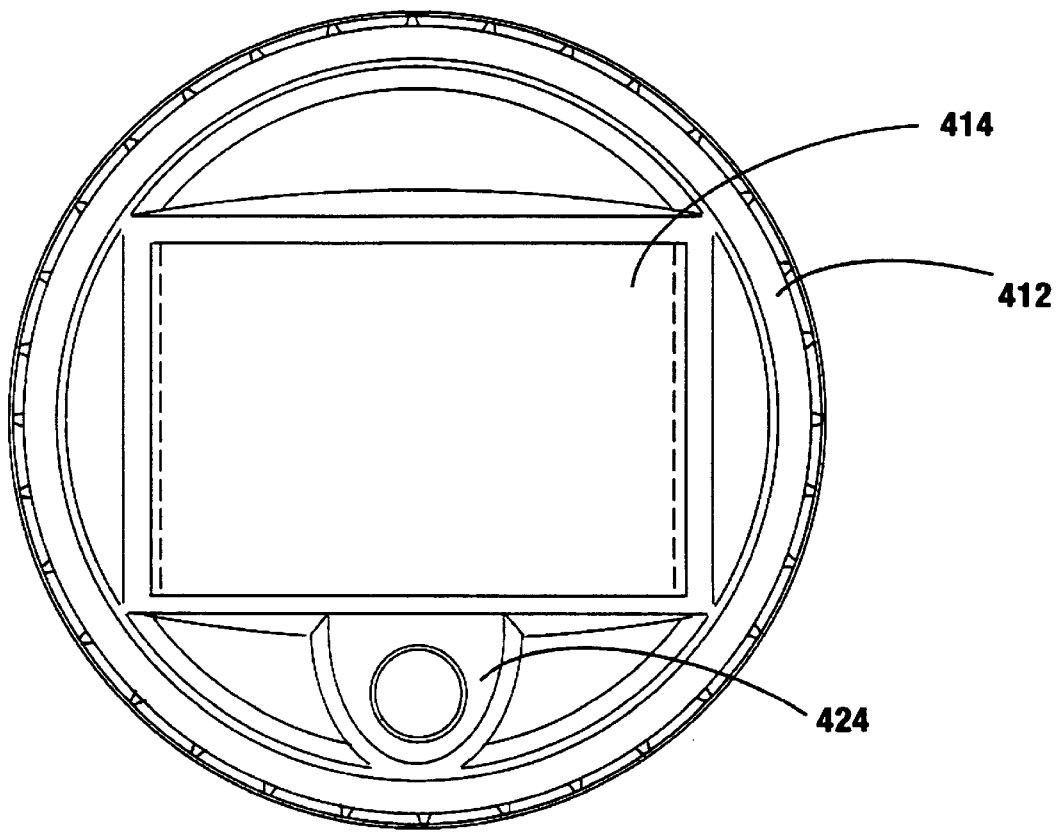
FIG. 16 is a top planar view of the container of FIG. 15.
Figure 17:
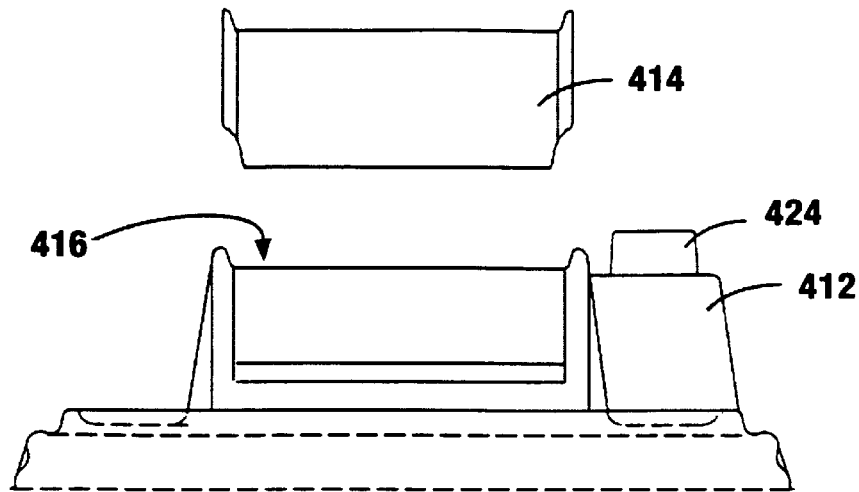
FIG. 17 is a side exploded view of the closure of FIG. 15.
Figure 18:
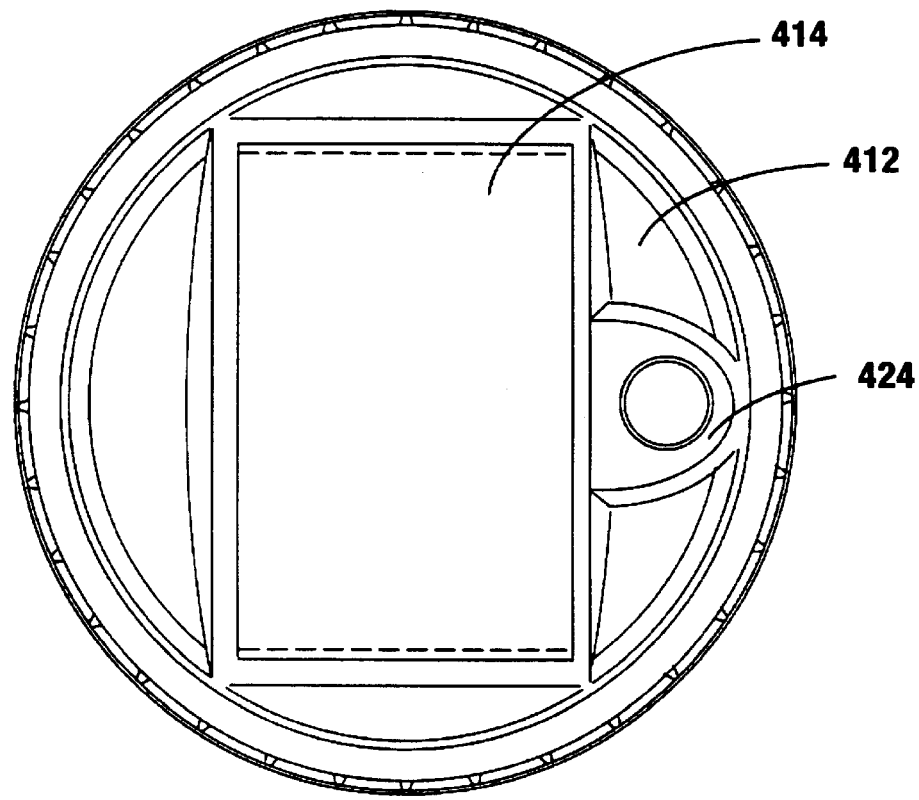
FIG. 18 is another top planar view of the closure of FIG. 15, rotated by 90 degrees.

FIGS. 15–18 illustrate a closure 410 wherein an inner member 412 and an outer member 414 are configured to provide a curved compartment 416 for holding a booklet or the like, rather than a disk-shaped compartment for holding a digital media disk. As best seen in FIGS. 15 and 17 the upper member is a small curved member sized and configured to snap onto the top of the inner member to form a compartment therebetween. Hence, the embodiment of FIGS. 15–18 is similar in some respects to the embodiment of FIGS. 3 and 4 wherein an upper member is sized to snap onto a top of the inner member rather than to substantially cover the inner member as with the other embodiments. In other respects, the embodiment of FIGS. 15–18 is similar to the embodiment of FIGS. 7–14 wherein a raised portion 424 of the inner member is offset from the center of the closure such that a straw inserted through the closure into a cup passes along side the compartment rather than through the compartment.

Figure 19:
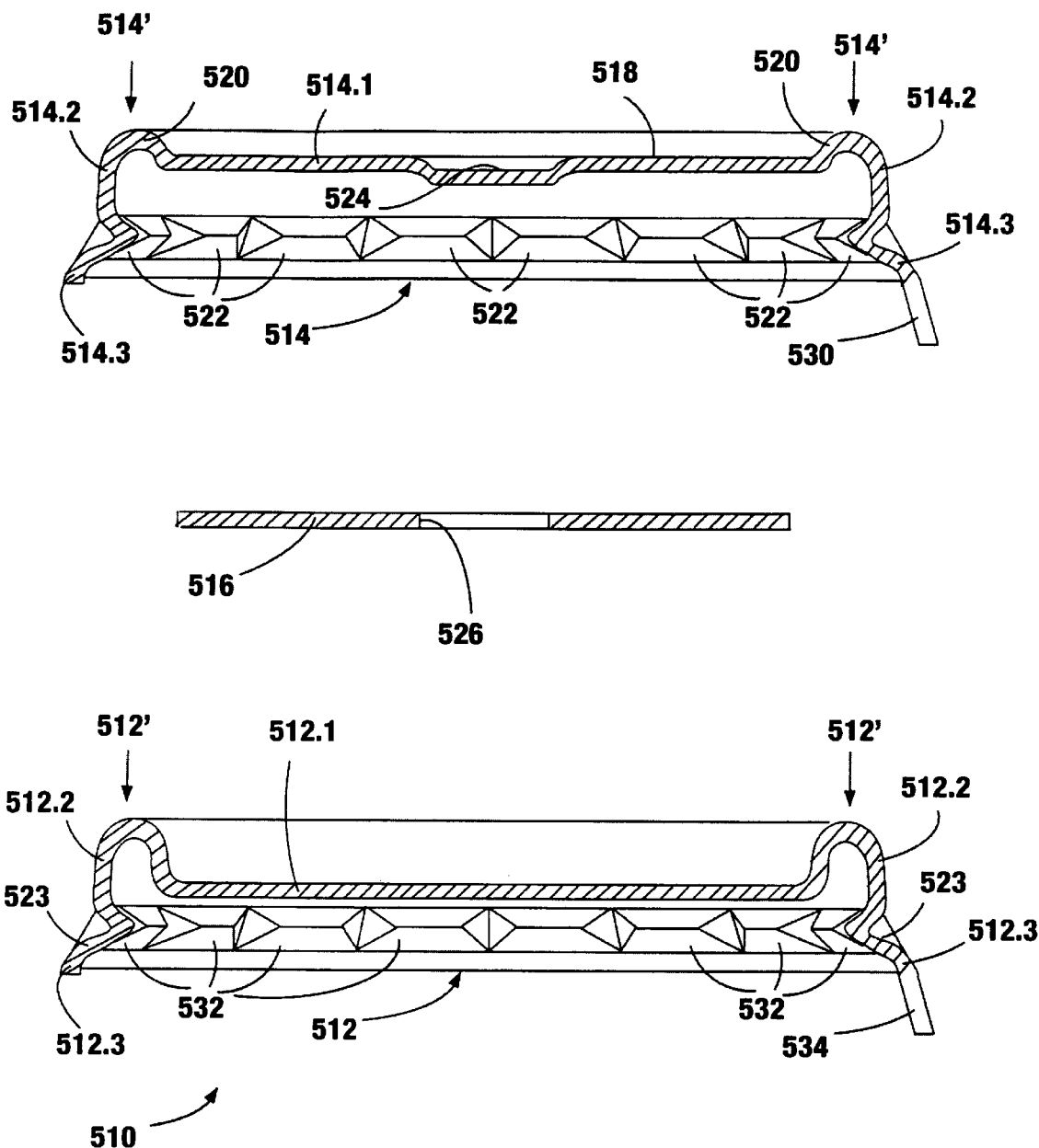
FIG. 19 is an exploded cross-sectional view of a merchandise container closure of the sixth exemplary embodiment of the invention, taken on a plane which contains the axis of symmetry of the closure.
Figure 20:
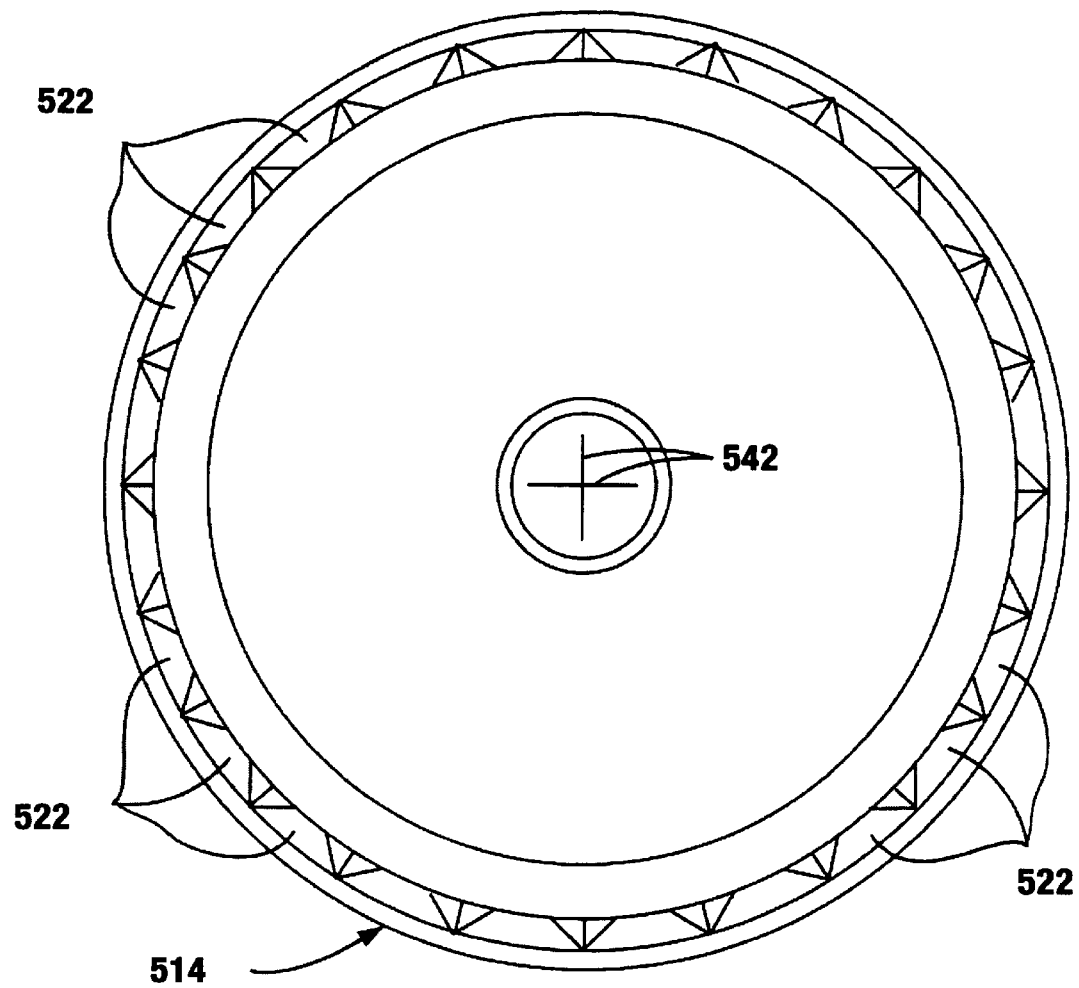
FIG. 20 is a top view of the outer member of the closure of the embodiment of the invention shown in FIG. 19.
Figure 21:
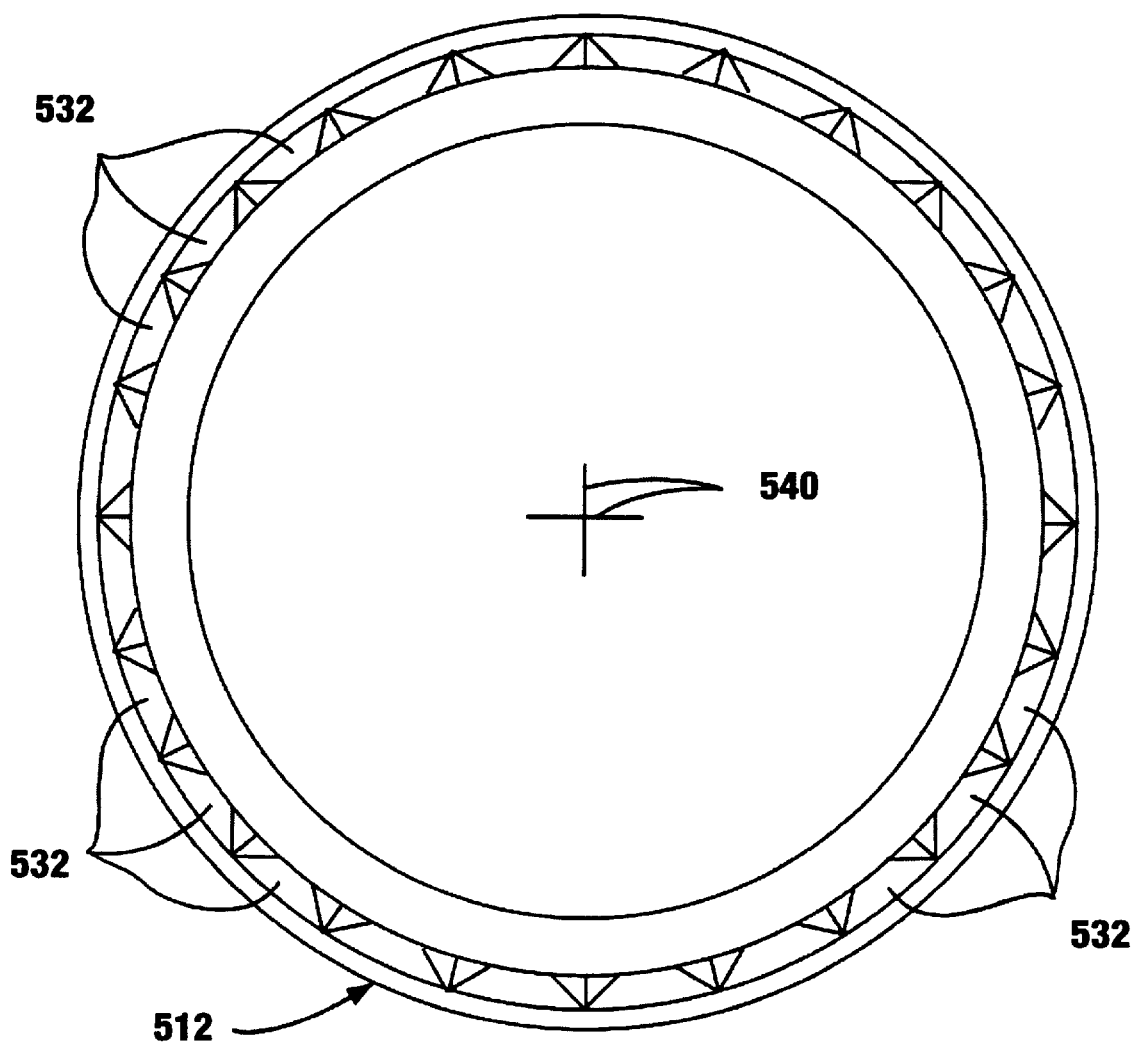
FIG. 21 is a top view of the inner member of the closure of the embodiment of the invention shown in FIGS. 19 and 20.

Referring now to FIGS. 19–21, a sixth exemplary embodiment of the invention will now be described. The embodiment of FIGS. 19–21 is similar to that of the foregoing embodiments and only pertinent differences will be described in detail. As before, like components are represented with like reference numerals incremented accordingly.

FIGS. 19–21 illustrates a closure 510 comprised of an inner member 512 and an outer member 514. A compact disk or CD recording 16 is captive between inner member 512 and outer member 514. As may be seen by comparison of FIGS. 19 and 20, outer member 514 has a discate central portion 514.1 around the periphery of which is erected a shallow, cylindrical flange 514.2. Thus, it will be seen that outer member 514 generally takes the form of a very shallow cup. As will be seen in FIG. 19, a slight recess or depression 518 is formed in the discate portion 514.1 of outer member 514, the wall 520 of which depression serves to stiffen outer member 514 in the well-known manner. As also seen in FIG. 19, a trunco-conical flange 514.3 extends outwardly from the lower edge of cylindrical flange 514.2 remote from discate part 514.1. A plurality of protrusions 522 project inwardly from the inner face of truncoconical flange 514.3. In practice a much larger number of protrusions 522 may be provided. A suitable depression 523 is provided in the outer face of the trunco-conical flange 514.3 of inner member 512 for receiving protrusions 522, and thus locking inner member 512 and outer member 514 together in nesting relationship when inner member 512 is registered with and then pushed into outer member 514.

It is to be understood that inner member 512 and outer member 514 are of such configuration that when they are locked together in the manner just described, a cavity is defined between them which is large enough to contain compact disk 516. As also seen in FIG. 19, a boss 524 is raised on the outer discate face of depression 518, and that boss 524 fits closely within the central opening 526 of compact disk 516. It follows, then, that boss 524 serves to maintain compact disk 516 substantially coaxial with the common axis of symmetry of closure members 512 and 514 when those members are locked together in the manner described herein-above and compact disk 516 is captive between inner member 512 and outer member 514.

As will be evident to those having ordinary skill in the plastics arts, informed by the present disclosure, truncoconical flange 514.3 is sufficiently resilient and flexible, and the extent of projection of protrusions 522 into depression 523 is so limited, that outer member 514 can be separated from inner member 512 by pulling outwardly and upwardly on a single point of trunco-conical flange 514.3. A manually graspable pull tab 530 will be provided at a point on the outer periphery of trunco-conical flange 514.3 in order to render it easy for the purchaser to apply such a pulling force to outer member 514, and thus to separate it from inner member 512, whereby to gain access to compact disk 516.

Referring again to FIG. 19, it will be seen that inner member 512 is comprised of a discate portion 512.1, a substantially cylindrical flange portion 512.2 and a trunco-conical flange portion 512.3. These portions of inner member 512 correspond generally to the correspondingly denominated portions of outer member 514. As also seen in FIG. 19, trunco-conical flange portion 512.3 is provided with inwardly projecting protrusions 532 which are similar to the inwardly projecting protrusions 522 of outer member 514. Protrusions 532 are so constructed and arranged as to efficiently cooperate with a part of the merchandise container upon which closure 510 is to be mounted. Thus, for example, if closure 510 is to be mounted upon an aluminum soft drink can of well known type, protrusions 532 will be constructed and arranged to engage with the bead or some other structural feature of that soft drink can, whereby to lock closure 510 onto the upper end of that soft drink can.

A pull tab 534, corresponding to pull tab 530, may be provided on the periphery of trunco-conical flange 512.3, whereby closure 510 as a whole may readily be removed from the soft drink can or other associated merchandise container when it is desired to remove closure 510 without gaining access to compact disk 516.

As best seen in FIGS. 20 and 21, pairs of intersecting slits 540, 542 may be provided, respectively, in inner member 512 and outer member 514, whereby a soda straw may be thrust through members 512 and 514, and into the interior of the associated merchandise container, in those applications of the invention in which the merchandise container is an open-topped cup or the like, and closure 510 is the only closure, as when soft drinks are supplied at fast food restaurants.

The inner and outer members of closure 510 may be fabricated by vacuum-forming or injection-molding certain well known plastic materials, in the well known manner. The thickness of the plastic sheet material from which blanks are formed, when vacuum forming, may range from about 0.005 inches to, in some extreme cases, about 0.060 inches or more. These sheet materials may be clear or opaque, or a combination of clear and opaque. A suitable material in some applications may be styrene. Compact disk 516 may be, in certain applications of the invention, replaced by other products, such as promotional materials, incentive "bonus" offers, product samples, etc.

Figure 22:
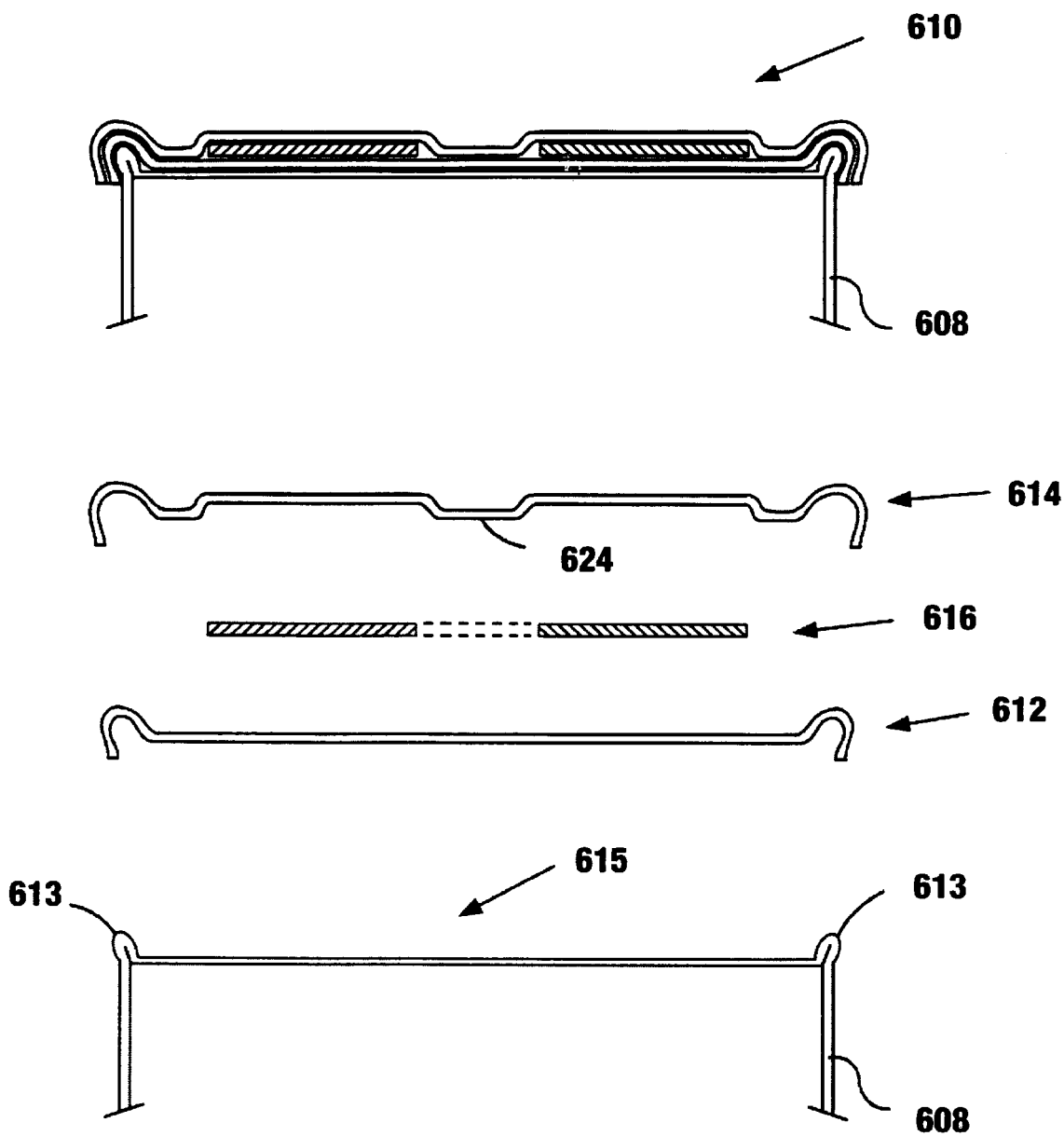
FIG. 22 is a side elevational view of a seventh exemplary embodiment providing a closure mounted to a can.

The merchandise containers in certain applications of the present invention may be popcorn buckets, soft drink cans, beer cans, motor oil cans, cans used in the vending of certain cooked foods such as tomatoes, and cans of the special size in which peanuts are vended. FIG. 22 illustrates an embodiment wherein a closure 610 is mounted to a conventional can 608. The closure includes an inner member 612 and an outer member 614 forming a compartment sized for receiving a digital media disk 616 as shown. A central depressed portion 624 of upper member 614 extends downwardly into a central hole of the digital disk to help secure the disk. Peripheral edges of the inner and outer members snap onto a rim 613 of the can. The closure is sized and configured to position the digital disk within a depression 615 of can 608 below the top level of rim 613. Hence, the presence of the closure and disk contained therein does not significantly add to the overall height of the can allowing the can to be easily packaged and stacked along with other cans.

Although described primarily with respect to digital media disks, it is also to be understood that the closures of the invention may be formed in different configurations to hold and display many different items, such as game cards, game pieces, toys, coupons, stamps and stickers, scratch-off cards, and the like.

It is further to be understood, as part of the invention, that in certain applications of the invention it may be found desirable to permanently join the inner and outer members, as by sonic welding or thermal welding, so that the closure must be "broken" in order to gain access to the premium or other item contained between the inner member and the outer member.

In accordance with another feature of the invention an enlarging lens or distorting lens may be incorporated into the outer closure member of a particular embodiment or embodiments of the invention, whereby to magnify or distort printed matter or objects placed in a recess in the upper surface of the outer closure member. The lenses employed in this embodiment of the present invention may be common lenses or Fresnel lenses. The recess in the upper surface of the outer member of the closure of this embodiment may be a shallow, flat-bottomed recess having a plurality of ears projecting from the wall of the recess, which ears are so constructed and arranged that the art work or other objects to be mounted therein can be pushed downwardly into the recess, and will "automatically" become trapped under the tabs.

What have been described are various exemplary embodiments of closures for use with merchandise containers, particularly drink cups. It should be a understood, however, that the examples described herein merely illustrate aspects of the invention and should not be construed as limiting the scope of the invention which may be implemented in any manner consistent with the general principles of the invention described therein.

What is claimed is:

1. A closure for a drink container, said closure comprising:

an inner member having an opening formed therein for receiving a straw and having a peripheral portion for mounting to the drink container;

an outer member configured to be fitted to said inner member forming a compartment therebetween, said outer member also having an opening, with the opening of said outer member aligned with the opening of said inner member while the outer member is fitted to said inner member, with the aligned openings permitting penetration of a straw therethrough;

wherein said inner member is shaped to prevent liquid from within the drink container from entering the compartment even while a straw penetrates the aligned openings of said inner and outer members; and a digital media disk is disposed within the compartment, wherein said compartment is shaped to closely receive the digital media disk, with the openings of said inner and outer members aligned with a center of the compartment to permit a straw penetrating said openings to pass through a center hole within the digital media disk.

2. The closure of claim 1 wherein said inner member includes a raised portion positioned and configured to extend through said opening of said outer member while said outer member is fitted to said inner member, with the opening of said inner member formed within said raised portion.

3. The closure of claim 2 wherein said opening of said outer member is circular and wherein said raised portion of said inner member is of a truncated conical shape.

4. The closure of claim 3 wherein portions of said outer member surrounding the circular opening are sized to frictionally fit against outer side surfaces of said raised portion while said outer member is fitted to said inner member.

5. The closure of claim 3 wherein portions of said outer member surrounding the circular opening are sized to abut a tab formed around outer side surfaces of said raised portion while said outer member is fitted to said inner member.

6. The closure of claim 1 wherein said inner member includes peripheral sidewalls extending upwardly from said peripheral portion of said inner member toward the compartment formed between portions of said inner and outer members.

7. The closure of claim 1 wherein said outer member has a peripheral portion for engaging said peripheral portion of said inner member.

8. The closure of claim 1 wherein said opening of said inner member comprises crossed slits.

9. The closure of claim 1 wherein portions of said inner member forming a bottom of the compartment are positioned above said outer perimeter of said inner member such that, in use, the bottom of the compartment is disposed above the level of any liquid contained in the drink container.

10. A closure for a drink container, said closure comprising:

a unitary inner member having an opening formed therein for receiving a straw and having a peripheral portion for mounting to a rim of the drink container, said inner member including a central portion forming a curved top surface; and a curved unitary outer member configured to be fitted to said central portion of said inner member forming a curved compartment therebetween;

wherein portions of said inner member forming a bottom of the compartment are positioned above said peripheral portion of said inner member such that, in use, the bottom of the compartment is disposed above the rim of the drink container.

11. The closure of claim 10 wherein said inner member includes peripheral sidewalls extending upwardly from said peripheral portion of said inner member toward the compartment formed between portions of said inner and outer members.

12. The closure of claim 10 wherein said opening of said inner member comprises crossed slits.

* * * * *